United States Patent [19]

Grinsteiner et al.

[11] Patent Number: 4,856,711
[45] Date of Patent: Aug. 15, 1989

[54] DOUBLE SEAL THERMOSTAT

[75] Inventors: James J. Grinsteiner, Roselle, Ill.; George J. Maat, Pompano Beach, Fla.

[73] Assignee: Navistar International Transportation Corp., Chicago, Ill.

[21] Appl. No.: 236,097

[22] Filed: Aug. 24, 1988

Related U.S. Application Data

[60] Division of Ser. No. 51,241, May 13, 1987, Pat. No. 4,776,513, and a continuation of Ser. No. 738,621, May 28, 1985, abandoned.

[51] Int. Cl.$^4$ .............................................. F01P 7/02
[52] U.S. Cl. .................................... 236/34.5; 251/210
[58] Field of Search ............................... 239/34.5, 34; 137/614.18, 630.19; 251/210

[56] References Cited

U.S. PATENT DOCUMENTS

| | | | |
|---|---|---|---|
| 2,403,028 | 7/1946 | Smith | 251/210 |
| 2,595,012 | 4/1952 | Smith | 137/630.19 |
| 2,610,021 | 9/1952 | Smith | 251/332 |
| 2,720,219 | 10/1955 | Grove et al. | 137/630.19 |
| 2,953,165 | 9/1960 | Reynolds | 137/625.4 |
| 3,084,903 | 4/1963 | Parks | 251/187 |
| 3,152,604 | 10/1964 | Frye et al. | 137/202 |
| 3,248,021 | 4/1966 | Corsette et al. | 251/333 X |
| 3,248,056 | 4/1966 | Obermaier | 236/34 |
| 3,963,049 | 6/1976 | Beauregard | 251/210 X |
| 4,232,695 | 11/1980 | Roberge | 251/210 X |
| 4,257,553 | 3/1981 | Sliger et al. | 236/34.5 |
| 4,529,168 | 7/1985 | Timmermans | 251/210 |

FOREIGN PATENT DOCUMENTS 705675 3/1954 United Kingdom ................ 251/210

Primary Examiner—William E. Wayner
Attorney, Agent, or Firm—F. David AuBuchon; Dennis K. Sullivan

[57] ABSTRACT

A choke type thermostat is provided with dual choke seals including a conventional primary choke and a secondary choke which seals with the valve seat of the thermostat prior to the sealing of the primary choke. The secondary choke provides additional sealing for the valve and also functions to strain the flow of coolant which is allowed to pass over the primary choke, thereby preventing sand or other debris from interfering with the sealing of the primary choke.

2 Claims, 2 Drawing Sheets

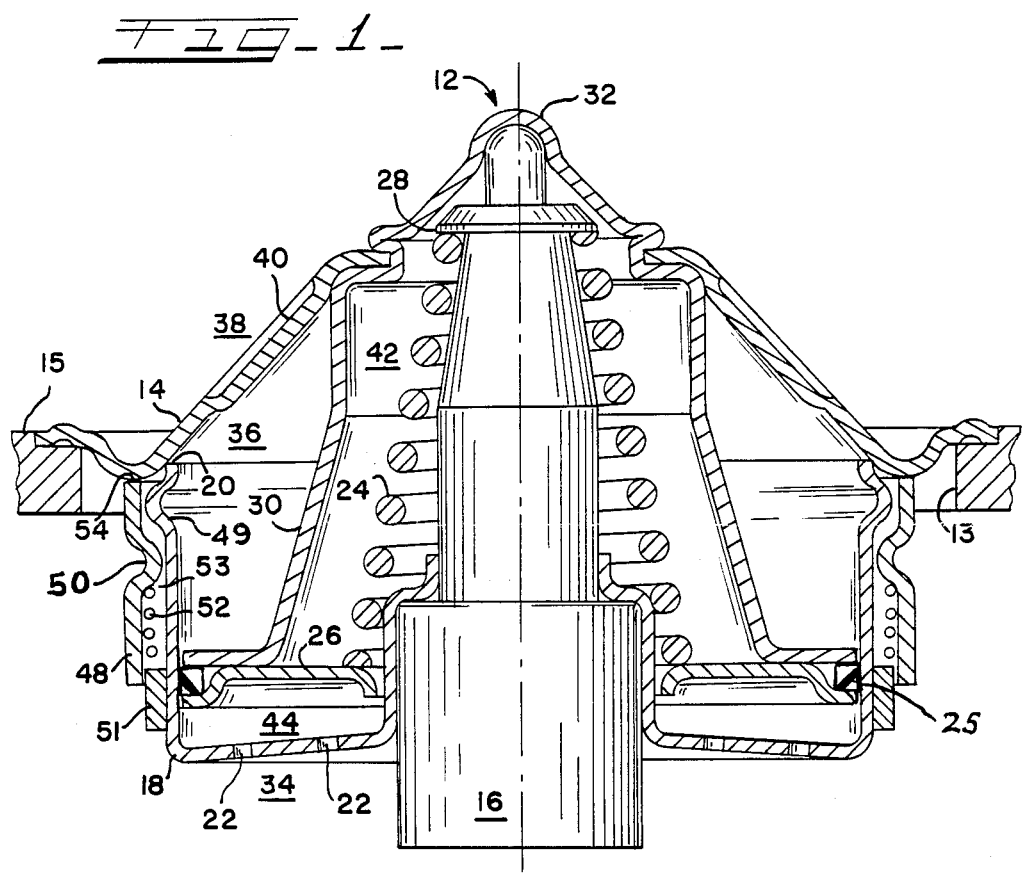

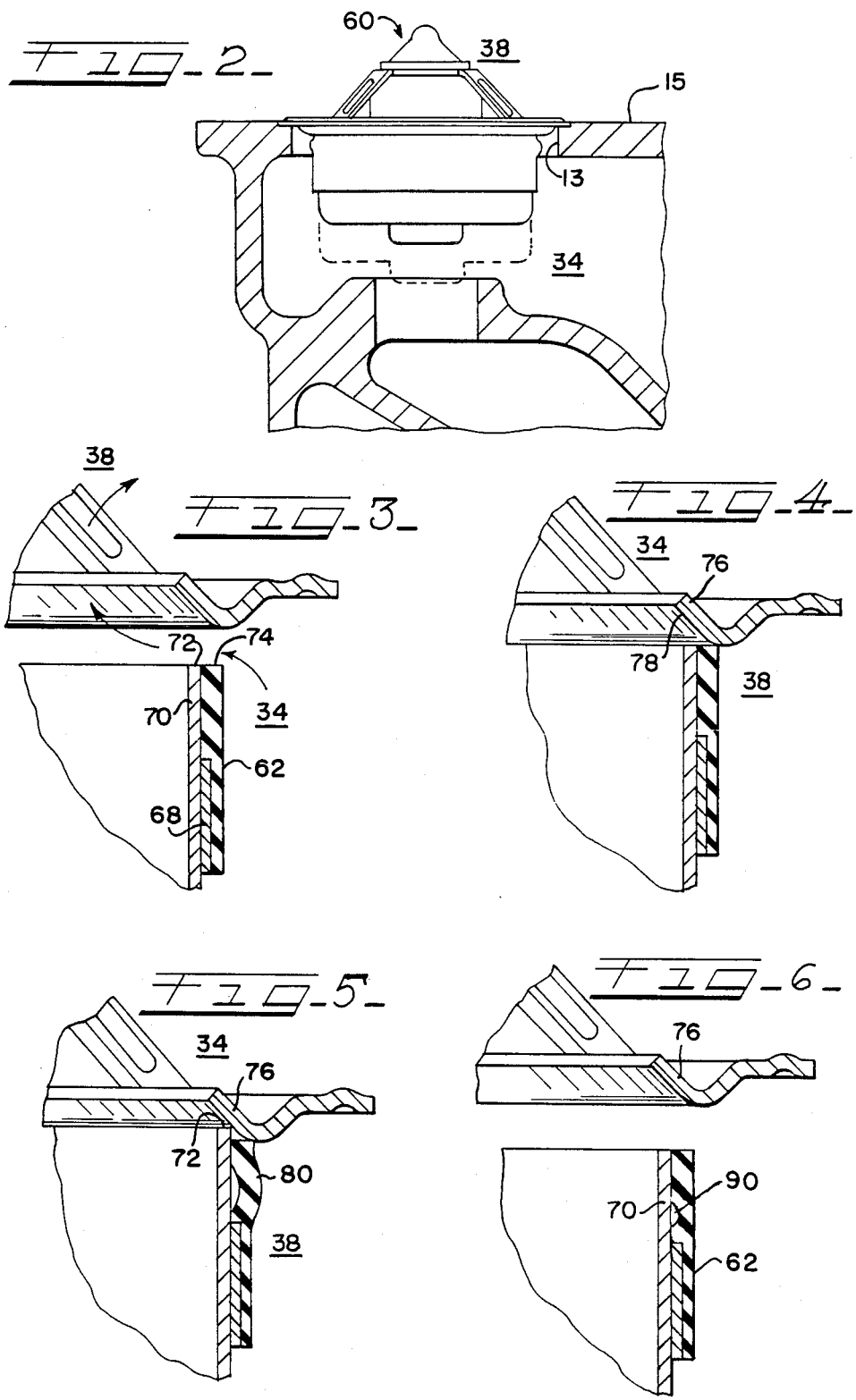

DOUBLE SEAL THERMOSTAT

This is a division of application Ser. No. 051,241, filed May 13, 1987, now U.S. Pat. No. 4,776,513 a continuation of Ser. No. 738,621 filed May 28, 1985 and now abandoned. This application is related to U.S. Pat. No. 4,653,688 assigned to the assignee hereof.

BACKGROUND OF THE INVENTION

The field of the present invention is that of thermostats. More particularly, the field of the present invention is choke type thermostats for automotive engines.

DISCLOSURE STATEMENT

Thermostats typically control engine temperature by allowing selective passage of engine coolant from the engine coolant outlet to a radiator or to an engine coolant bypass passage. Automotive engine thermostats are two major kinds, poppet and choke type. Poppet type thermostats have a plate which covers a valve seat separating the radiator passage from the engine coolant passage. To open during operation, the plate of the poppet type thermostat must overcome the fluid pressure of the engine coolant system. This causes the poppet type thermostat to rapidly open and shut, therefore the poppet type thermostat does not display smooth operating characteristics. An example of a poppet type thermostat is described in Sliger et al. U.S. Patent No. 4,257,553. Choke type thermostats have a sealing member shaped like a cylinder and are configured to be non-pressure dependent. Choke type thermostats thus are better suited for engines which operate at higher engine coolant system pressures.

Internal combustion engines may often have various sources of foreign matter in the engine coolant which may interfere with the opening and closing of the thermostat. The interfering matter may often be sand or other debris left from casting or machining operations. On occasion interfering particles can become wedged between the sealing member of the thermostat and the valve seat. When this happens, the valve member is prevented from mating with the valve seat when the coolant temperature drops below the desired operating level. The thermostat is held open allowing coolant to flow into the radiator and preventing the engine from reaching its desired operating temperature and its maximum performance level. Also the vehicle heater will not reach a proper temperature causing possible operator discomfort.

Since the engine coolant temperature is not allowed to reach proper operating conditions, the thermostat will not be heated to a temperature sufficient for the thermoelongating pin connected with the valve member to expand. Therefore the wedged particle will not be released and the disfunction of the thermostat is permanent. The thermostat will have to be removed and be repaired or replaced before the engine coolant system will properly operate. It will be readily apparent to those familiar in the art that such a removal or repair of the thermostat will usually require an expenditure in time and money.

SUMMARY OF THE INVENTION

To overcome the disadvantages of prior thermostats the present invention is brought forth. The present invention is a choke type thermostat with two sealing members (commonly referred to as chokes). The thermostat of the present invention has a primary choke and a secondary choke which surrounds the first choke member and is connected thereto.

The secondary choke has two major functions. The first function of the additional choke is to provide an additional seal when it mates with the valve seat. The second function of the secondary choke is to strain the flow of coolant going past the primary choke before the primary choke mates with the valve seat. This straining function prevents sand, dirt or other debris from flowing past the primary (usually inner) choke as it approaches its sealing position with the valve seat.

When the coolant temperature drops, the secondary choke will close first. If the secondary choke by chance captures a foreign particle, the primary choke will still be allowed to close. The coolant will still be prevented from flowing to the radiator and the coolant eventually will become sufficiently hot to allow both chokes to reopen, therefore usually allowing the foreign particle to be dislodged from the secondary choke. Even if the secondary choke were to remain inoperative due to the retention of the foreign particle, the primary choke would still function. Therefore, the thermostat would continue its main function.

It is an object of the present invention to provide a choke type thermostat with dual chokes. It is an object of the present invention to provide a thermostat with dual chokes wherein the secondary choke strains the flow of coolant passing over the primary choke. It is an object of an embodiment of the present invention to provide a dual choke thermostat which utilizes an elastomeric outer choke.

Other objects and advantages of the present invention will become apparent to those skilled in the art as the nature of the invention is better understood from the accompanying drawings and detailed description.

BRIEF DESCRIPTION OF THE DRAWINGS

FIG. 1 is a sectional view of the thermostat of the present invention utilizing a metallic secondary choke member;

FIG. 2 illustrates an embodiment of the present invention with an elastic secondary choke member installed in an engine coolant system;

FIGS. 3-5 are an exploded view of the circled area of FIG. 2 illustrating the sequence of sealing of the separate choke members; and FIG. 6 illustrates an alternative embodiment of the secondary choke member illustrated in FIG. 2 having an annular groove on its inner periphery to provide additional flexibility.

DETAIL DESCRIPTION OF THE DRAWINGS

Referring to FIG. 1, the choke type thermostat 12 includes a circular valve seat 14 having a disc-like outer edge, an upturned conical inner portion which is installed in aperture 13 in the coolant system of engine 15 separating the interior engine coolant outlet passage 34 from the radiator outlet side 38. Fitted within the valve seat 14 along its axis thereof is a conventional thermoelongating valve pin 16. Fixably attached about the axial valve pin 16 is a cup-shaped element 18 referred to as the choke having its open end disposed adjacent the valve seat 14. The choke 18 makes sealing contact with the valve seat 14 along the sealing edge 20 at its open end.

Valve pin 16 is biased toward valve seat 16 by spring 24 which is captured between retaining base 26 and flange 28 of pin 16 as is seal ring 25. Support structures 30 and 26 are fixably connected with one another and are also fixably attached to the valve seat 14.

Spring 24 urges pin 16 toward crown 32 of supporting structure 30. This causes sealing surface 20 of choke 18 to mate with valve seat 14 preventing the coolant from flowing from engine passage 34 to control volume 36, through perforation 40, to radiator outlet 38. As the engine coolant temperature rises, pin 16 elongates axially causing fixably attached choke 18 to move away from valve seat 14 thus allowing flow to radiator outlet 38.

Choke 18 has a series of perforations 22 which allow the flow of coolant from engine outlet 34 into control volumes 44 and 42. Since the pressure within control volume 42 and 44 is equal to the pressure of the engine passage 34, movement of choke 18 away from valve seat 14 is not dependent upon engine system pressure. Since the movement of choke 18 is not pressure dependent, the choke type thermostat will open and close in a smooth gradual manner. It will be appreciated that the foregoing is a description of a conventional single choke thermostat.

In accordance with the invention thermostat 12 additionally is provided with a sleeve-like, secondary choke 48 of thin walled cylindrical configuration concentrically surrounding the primary choke 18. The secondary choke 48 is slideable axially on choke 18 and is controlled thereon by interfering crimps 49 and 50 respectively in the cylindrical walls of chokes 18 and 48 and by spring 52 supported by ring 51 press fit on the periphery of primary choke 18. Secondary choke 48 is positioned such that sealing surface 54 mates with valve seat 14 prior to the mating of sealing surface 20 of choke 18 therewith. As may be observed from the relative sizes of the valve spring 24 and secondary choke spring 52, only a relatively small load is imposed on the valve seat 14 by the engagement of the secondary choke 48 therewith, and upon engagement of the primary choke 18 with the valve seat 14, the closing force of valve spring 24 is transmitted primarily through the choke 18. In the matting position, the control volume 53 between the separate chokes is sealed from engine passage 34.

Secondary choke 48 provides two major functions. The first function of secondary choke 48 is to provide an independent seal between the engine coolant passage 34 and the radiator outlet 38. The second function of secondary choke member 48 comes into play during operation. Since secondary choke member 48 mates with valve seat 14 prior to the mating of choke 18, secondary choke 48 which gradually engages valve seat 14 because there is no coolant pressure acting on it, has the effect, just before closing, of straining the engine coolant flow going past sealing surface 20. Therefore secondary choke 48 prevents foreign particles from flowing past sealing surface 20 as sealing surface 20 itself gradually approaches valve seat 14.

If by chance a foreign particle becomes captured between sealing surface 54 and valve seat 14 of thermostat 12, the first choke 18 will still close and make sealing contact with the valve seat 14. When the coolant temperature increases, valve pin 16 will elongate causing sealing surface 20 to depart from valve seat 14. The elongation of valve pin 16 eventually will also cause sealing surface 54 to depart from valve seat 14, releasing any entrapped foreign particle and allowing it to flow through the radiator outlet 38. Therefore, the thermostat is not retained in an open position on the next thermal cycle of the engine coolant. Even in circumstances where the foreign particle is retained by secondary choke 48, the thermostat 12 will remain operative since choke 18 operation will remain unchanged.

For ease of fabrication it is ususally desirable to have secondary choke member 48 attached to the primary choke 18, however, it is apparent that those skilled in the art that secondary choke member 48 may be independently attached to valve pin 16 but is desirably telescoped about the periphery of choke 18.

Referring to FIGS. 2, 3, 4, and 5, an alternative embodiment of the present invention provides a dual choke thermostat 60 which has a elastomeric secondary choke 62. The elastomeric secondary choke 62 typically comprises nitrile rubber which is molded to a brass metal band 68 along its inner periphery. The metal band 68 can then be press fit over the inner primary choke 70. Although not required, the embodiment of the present invention illustrated in FIGS. 2-5 have the respective sealing surfaces 72 and 74 of choke member 70 and 62 in a coplanar orientation.

Due to the tapered portion 78 of valve seat 76, the secondary or outer choke 62 mates with the valve seat 76 prior to the mating of choke 70. Therefore, as the outer choke moves close to engagement with the valve seat 76, coolant flow past mating surface 72 will be strained by secondary choke 62. In this connection, it is noted that the sleeve-like configuration of the secondary choke 62 and its telescoping action relative to the primary choke 70 results in the sealing load on the elastomeric secondary choke being substantially independent of the fluid pressure differential across the thermostat and produces a gradual closure of the valve resulting in the aforementioned straining function as opposed to the abrupt closure which would occur if fluid pressure closed the elastomeric choke. Upon further closing of the thermostat 60, the mating surface 72 will also make sealing contact with valve seat virtue of its elastomeric portion 80, secondary choke 62 can undergo deformation to arch away from the choke 70 thereby accommodating trapped debris.

FIG. 6 illustrates an alternative embodiment of the elastomeric secondary choke 62 wherein there is added an annular groove 90 on its inner periphery to aid in the flexibility of the secondary choke member. Such a groove 90 may be highly advisable when using relatively stiff elastomeric materials to ensure that the secondary choke 62 is not so stiff as to prevent the choke 70 from mating with the valve seat 76.

In an alternative embodiment of the present invention (for reverse flow applications) not shown, the function of the secondaay choke member may be provided by the most inner choke. However, the function will remain the same and the secondary choke will be downstream of the primary choke.

While a few embodiments of the present invention have been explained, it will be readily apparent to those skilled in the art that other modifications can be made to the present invention without departing from the spirit and scope of this application as encompassed by the following claims.

What is claimed is:

1. A choke type double seal thermostat comprising:
 a circular valve body having an outer flange adapted for mounting in an engine and a valve seat tapered in the axial direction toward the axis of said of said valve body;

a thermoelongating valve pin disposed on the axis of said valve body, said valve body having means to retain a first end of said valve pin thereagainst;

a primary valve choke of cup-shaped configuration fixably attached to said valve pin, said primary valve choke having an open end defining a circular axial edge disposed to gradually move axially and independently of the pressure differential across the valve seat into sealing contact with said tapered valve seat;

a valve spring disposed between said first cylindrical valve choke and said valve pin to bias said first valve choke against said valve seat;

a secondary valve choke comprising a metallic cylinder axially slidably disposed concentrically adjacent the periphery of said primary valve choke, said secondary valve choke having a circular axial edge disposed in first spring biased position of said secondary valve choke to make, upon axial movement of said primary choke toward said valve seat, sealing contact with said valve seat prior to said primary choke contacting said valve seat; and a secondary choke compression spring operatively disposed between said primary valve choke and said secondary valve choke to bias said secondary valve choke to said spring biased position, said secondary choke spring being substantially smaller than said valve spring such that, upon said primary valve choke moving toward said valve seat, said secondary valve choke telescopingly retracts upon contact with said valve seat until said primary valve choke engages said valve seat.

2. The invention in accordance with claim 1 and said primary and secondary valve chokes having interengaging stop means disposed thereon for limiting the travel of said secondary choke to said first spring biased position.

* * * * *